(12) United States Patent
Paczkowski et al.

(10) Patent No.: US 9,392,446 B1
(45) Date of Patent: *Jul. 12, 2016

(54) AUTHENTICATING ENVIRONMENTAL SENSOR SYSTEMS BASED ON SECURITY KEYS IN COMMUNICATION SYSTEMS

(71) Applicant: Sprint Communications Company L.P., Overland Park, KS (US)

(72) Inventors: Lyle Walter Paczkowski, Mission Hills, KS (US); Geoffrey S. Martin, Overland Park, KS (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 523 days.

This patent is subject to a terminal disclaimer.

(21) Appl. No.: 13/958,937

(22) Filed: Aug. 5, 2013

(51) Int. Cl.
*H04L 29/06* (2006.01)
*H04W 12/04* (2009.01)

(52) U.S. Cl.
CPC ........... *H04W 12/04* (2013.01); *H04L 63/0876* (2013.01); *H04L 63/12* (2013.01)

(58) Field of Classification Search
None
See application file for complete search history.

(56) References Cited

U.S. PATENT DOCUMENTS

| 9,060,265 | B2* | 6/2015 | Huang | H04W 12/02 |
| 9,154,476 | B2* | 10/2015 | Tsiatsis | H04L 63/08 |
| 9,230,427 | B2* | 1/2016 | Lee | G08C 17/02 |
| 2009/0191857 | A1 | 7/2009 | Horn et al. | |
| 2009/0205028 | A1 | 8/2009 | Smeets et al. | |
| 2011/0022851 | A1* | 1/2011 | Yokota | H04L 9/0894 713/189 |
| 2011/0268274 | A1* | 11/2011 | Qiu | H04L 9/0844 380/270 |
| 2012/0133508 | A1* | 5/2012 | Stebe | G06Q 10/00 340/540 |
| 2012/0265983 | A1 | 10/2012 | Yegin et al. | |

FOREIGN PATENT DOCUMENTS

| EP | 2243311 | 8/2009 |
| WO | 2009098130 | 8/2009 |

OTHER PUBLICATIONS

Camtepe, "Key Distribution Mechanisms for Wireless Sensor Networks: A Survey", Rensselaer Polytechnic Institute, 2005, pp. 1-27.*
Chen, "Dynamic Session-Key Generation for Wireless Sensor Networks", Department of Computer Science and Information Engineering, Chaoyang University of Technology, 2008, pp. 1-10.*

(Continued)

*Primary Examiner* — Benjamin Lanier

(57) ABSTRACT

Systems, methods, and software for operating environmental sensor systems are provided herein. In one example, a method is provided that includes monitoring environmental conditions to detect a trigger condition and transferring an access request for delivery to a data system responsive to the trigger condition. The method also includes receiving a security challenge transferred by the data system, and in response, transferring a security answer for delivery to the data system that includes a hash result generated using one of the security keys, and receiving a security grant transferred by the data system indicating one of the hash results. The method also includes selecting an environmental sensor function based on an association with one of the security keys used to generate the hash result indicated in the security grant, performing the environmental sensor function to obtain sensor data, and transferring the sensor data for delivery to the data system.

20 Claims, 5 Drawing Sheets

(56) References Cited

OTHER PUBLICATIONS

Gruenwald, "SWARMS: A Sensornet Wide Area Remote Management System", Deparment of Computer Science, University of Colorado, 2007, pp. 1-10.*

Hu, "Scalable security in wireless sensor and actuator networks (WSANs): Integration re-keying with routing", Rochester Institute of Technology, 2007, pp. 1-25.*

Zeng, "A Real-time Architecture for Automated Wireless Sensor and Actuator Networks," Fifth International Conference on Wireless and Mobile Communications, 2009, pp. 1-6.*

* cited by examiner

AUTHENTICATING ENVIRONMENTAL SENSOR SYSTEMS BASED ON SECURITY KEYS IN COMMUNICATION SYSTEMS

TECHNICAL FIELD

Aspects of the disclosure are related to the field of sensor systems, and in particular, authenticating environmental sensor systems based on security keys in communication systems.

TECHNICAL BACKGROUND

Environmental sensors can be employed to detect various environmental conditions, such as gas concentrations, temperature, pressure, acceleration, geographic location, magnetic fields, humidity, seismic conditions, among other sensor functions. These sensors can be integrated into various other devices, such as wireless communication devices, smart phones, and computing devices, or can be stand-alone sensor devices which can communicate over various wired and wireless networks.

However, these sensors and sensor devices might not be trusted to provide secure or reliable data to various remote data collection sites, especially over wireless data networks. Various forms of security concerns are present in many of these sensor systems and wireless data networks. For example, the sensor might be impersonated by another malicious sensor system, or the sensor might not be authorized to transfer data to a certain remote data site. Although encryption can be employed to protect data in transit, the original data prior to encryption might be altered or corrupted by malicious or unauthorized systems or users.

Some sensor devices or communication devices include partitioned security 'zones' on the associated processing systems. For example, a first zone can be employed to execute open or untrusted applications and obtain untrusted or unauthenticated data, and a second zone can be employed to execute trusted applications or obtain authenticated data. These security zones can be implemented on separate microprocessors, in separate cores of a multi-core microprocessor, or otherwise allocated over different processing portions of a computing or sensor device. However, when multiple sensors are employed on a device with these security zones, indicating which sensor to use or authenticating data from a specific sensor can be difficult due to the various security zone measures.

OVERVIEW

Systems, methods, and software for operating environmental sensor systems are provided herein. In one example, a method of operating an environmental sensor system comprising a sensor portion to perform environmental sensor functions and a communication portion that stores security keys is provided. The method includes monitoring environmental conditions to detect a trigger condition and transferring an access request for delivery to a remote data system responsive to the detection of the trigger condition. The method also includes receiving a security challenge transferred by the remote data system, and in response, transferring a security answer for delivery to the remote data system that includes at least one hash result generated using at least one of the security keys, and receiving a security grant transferred by the remote data system indicating one of the hash results. The method also includes selecting one of the environmental sensor functions based on an association of the environmental sensor function with one of the security keys used to generate the hash result indicated in the security grant, performing the selected environmental sensor function to obtain sensor data, and transferring the sensor data for delivery to the remote data system.

In another example, an environmental sensor system is provided. The environmental sensor system includes a sensor portion configured to perform a plurality of environmental sensor functions and monitor environmental conditions to detect a trigger condition and a communication portion that stores a plurality of security keys. The communication portion is configured to transfer an access request for delivery to a remote data system responsive to the detection of the trigger condition, receive a security challenge transferred by the remote data system, and in response, transfer a security answer for delivery to the remote data system that includes at least one hash result generated using at least one of the security keys, receive a security grant transferred by the remote data system indicating one of the hash results, and select one of the environmental sensor functions based on an association of the environmental sensor function with one of the security keys used to generate the hash result indicated in the security grant. The sensor portion is configured to perform the selected environmental sensor function to obtain sensor data. The communication portion is configured to transfer the sensor data for delivery to the remote data system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
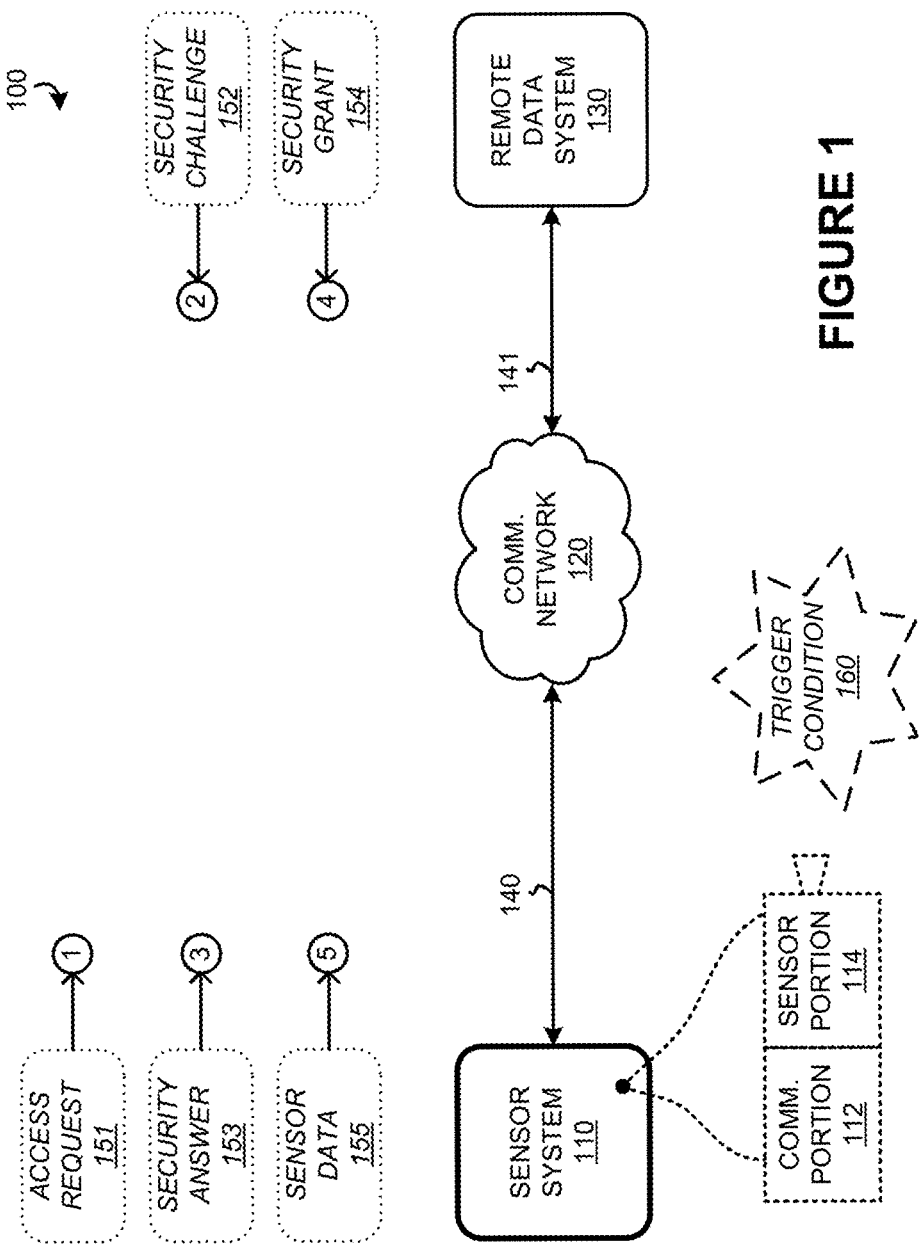
FIG. 1 is a system diagram illustrating a communication system.

FIG. 1 is a system diagram illustrating communication system 100. Communication system 100 includes sensor system 110, communication network 120, and remote data system 130. Sensor system 110 and communication network 120 communicate over communication link 140. Communication network 120 and remote data system 130 communicate over communication link 141. Sensor system 110 includes communication portion 112 communicatively coupled to sensor potion 114. Sensor portion 114 can perform one or more sensor functions, and communication portion 112 stores one or more security keys.

In operation, sensor system 110 includes one or more environmental sensors which can detect and measure environmental conditions, among other sensor functions. However, many times multiple sensors are included in sensor portion 114, and sensor system 110 might not know which sensor readings to perform. Furthermore, sensor system 110 authenticates with remote data system 130 before any associated sensor data can be trusted. In this example, both sensor selection and authentication of sensor data can be achieved, among other operations. Sensor system 110 includes one or more security keys, and stores these security keys in storage media associated with communication portion 112. These security keys can be employed in authenticating various sensor functions of sensor system 110.

As shown in FIG. 1, when trigger condition 160 is detected by sensor portion 114 of sensor system 110, access request 151 is transferred for delivery to remote data system 130. Security challenge 152 is transferred by remote data system 130 for delivery to sensory system 110, and sensor system 110 responsively transfers security answer 153 for delivery to remote data system 130. If security answer 153 includes sufficient security information, then security grant 154 is issued by remote data system 130. Sensor data 155 is then transferred by sensor system.

Figure 2:
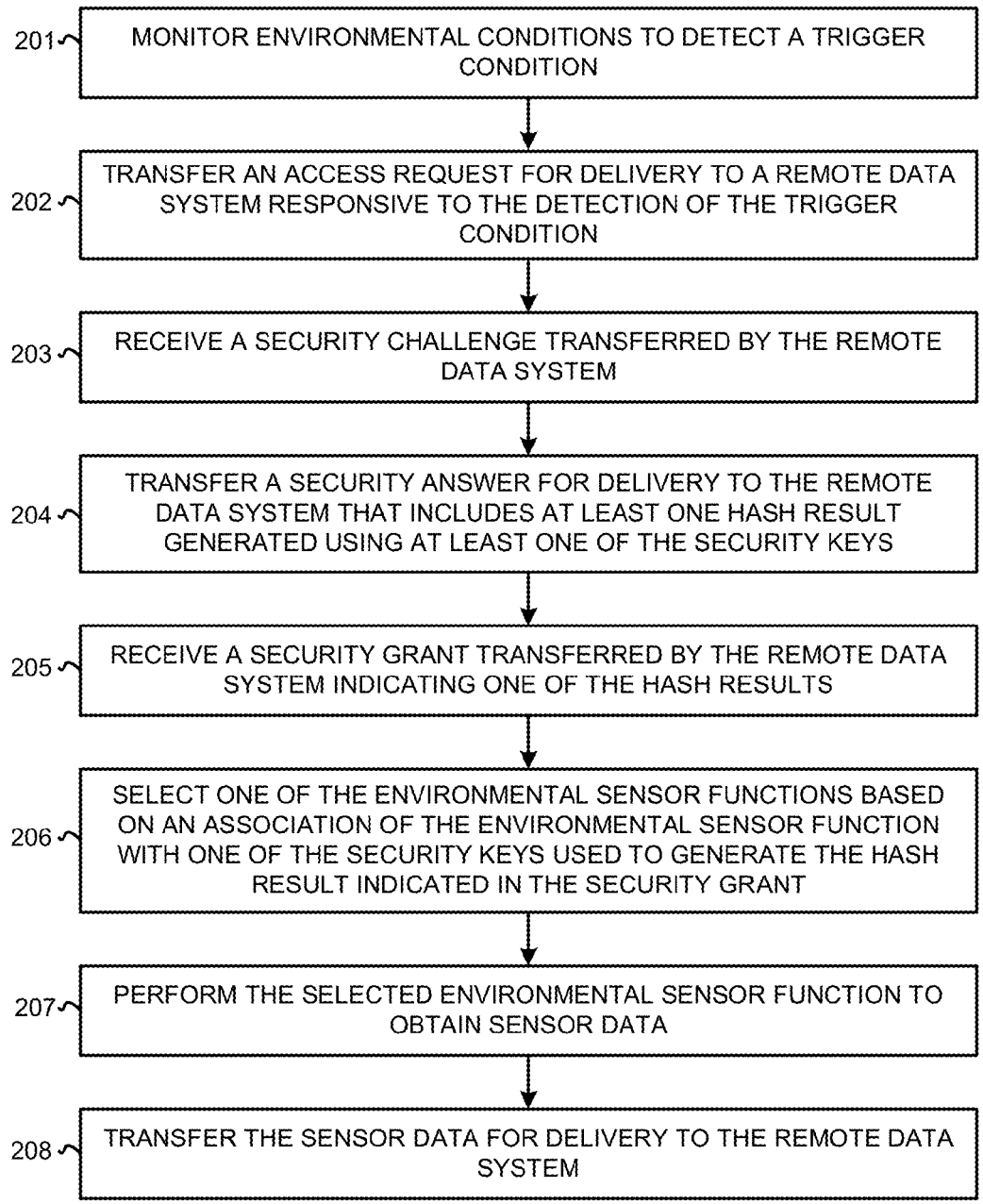
FIG. 2 is a flow diagram illustrating a method of operation of an environmental sensor system.

FIG. 2 is presented to illustrate another example operation of the elements of FIG. 1. FIG. 2 is a flow diagram illustrating a method of operation of environmental sensor system 100. The operations of FIG. 2 are referenced below parenthetically. As discussed above, sensor system 110 includes sensor portion 114 to perform one or more sensor functions, and communication portion 112 that stores one or more security keys.

In FIG. 2, sensor system 110 monitors (201) environmental conditions to detect trigger condition 160. Trigger condition 160 can be a threshold level of environmental condition as monitored by sensor portion 114 of sensor system 110. For example, if sensor portion 114 includes a pressure sensor, then when the pressure detected or monitored by sensor portion 114 satisfies a threshold pressure, then trigger condition 160 can be met. Other sensor functions can have associated trigger conditions and thresholds. As discussed herein, the sensor functions can include one or more sensors, which can detect or monitor various environmental conditions, such as gas concentrations, temperature, pressure, acceleration, geographic location, magnetic fields, humidity, seismic conditions, among other sensor functions.

Sensor system 110 transfers (202) an access request for delivery to remote data system 130 responsive to detection of trigger condition 160. In this example, access request 151 is transferred by communication portion 112 of sensor system 110 over link 140. Access request 151 can include a request for initiating communication with remote data system 130, such as an indication that trigger condition 160 has been met and a request to transfer sensor data associated with trigger condition 160.

Responsive to access request 151, sensor system 110 receives (203) a security challenge transferred by remote data system 130. In this example, remote data system 130 transfers security challenge 152 for delivery to sensor system 110 over link 141. Security challenge 152 can include a request for one or more hash results, security keys, passwords, usernames, or device identifiers, among other security and identification information. In some examples, security challenge 152 includes data or information which is to be processed using a security key or security keys included in sensor system 110. For example, security challenge 152 can include a portion of seed data that is to be encoded or encrypted using the security keys stored in sensor system 110.

Sensor system 110 transfers (204) a security answer for delivery to remote data system 130 that includes at least one hash result generated using at least one of the security keys stored in sensor system 110. Security answer 153 is transferred by sensor system 110 over link 140. The security keys can be encryption keys, pseudorandom keys, private keys, or other security keys. Each security key stored in sensory system 110 can be processed to determine a hash result or other encryption result. This hash result for one or more of the security keys is transferred in security answer 153. In some examples, all of the security keys are processed to identify a hash result for each security key. Other information, such as the seed data described above, can be used in processing the hash result. In other examples, a subset of the security keys is processed to identify associated hash results. Which ones of the security keys or hash results to include in security answer 153 can be determined by sensor system 110 based on the trigger condition. For example, when many sensors are included in sensor system 110, different trigger conditions can be associated with each sensor, and the trigger conditions that are satisfied can be used to determine which security key to process and identify a hash result. Other information can be included in security answer 153, such as indications for the one or more trigger condition that were satisfied.

Sensory system 110 receives (205) a security grant transferred by remote data system 130 indicating one of the hash results. In this example, security grant 154 is transferred by remote data system 130 over link 141. Remote data system 130 identifies at least one of the hash results transferred in security answer 153 as a granted hash result. This grant condition can be based on determining that the hash result is correct or corresponds to a proper security hash result, such as by determining a successful security handshaking using the hash result. The grant condition can also occur when the hash result is decrypted or decoded and corresponds to seed data or other information. In other examples, one or more hash results are selected from several hash results, and the selected hash result or results are indicated in security grant 154. The selected hash results indicated in security grant 154 can correspond to one or more sensors or sensor data in sensor system 110 desired by remote data system 130. These selected hash results in security grant 154 can be selected based on the trigger condition which originally prompted access request 151.

Sensor system 110 selects (206) one or more of the environmental sensor functions based on an association of the environmental sensor function with one of the security keys used to generate the hash result indicated in the security grant. In this example, sensor portion 114 can include more than one environmental sensor function, and each environmental sensor function can be associated with one or more security keys. The selected hash result indicated in security grant 154 corresponds to the security key originally used to generate the hash result. The security key can likewise be associated with a particular environmental sensor function, or more than one environmental sensor function.

Sensor system 110 performs (207) the selected environmental sensor function to obtain sensor data. The particular environmental sensor function or functions that are associated with the selected security key are instructed to perform the associated sensor functions. For example, if the selected environmental sensor function is a temperature sensor which is associated with the security key used to generate the hash result indicated in security grant 154, then sensor system 110 performs a temperature sensor reading to obtain sensor data. Other functions can be associated with a single security key. Sensor system 110 transfers (208) the sensor data for delivery to remote data system 130. In this example, the sensor data is transferred by communication portion 112 over link 140. In some examples, the sensor data is also encrypted or encoded using the security key used to generate the hash result indicated in security grant 154.

Figure 3:
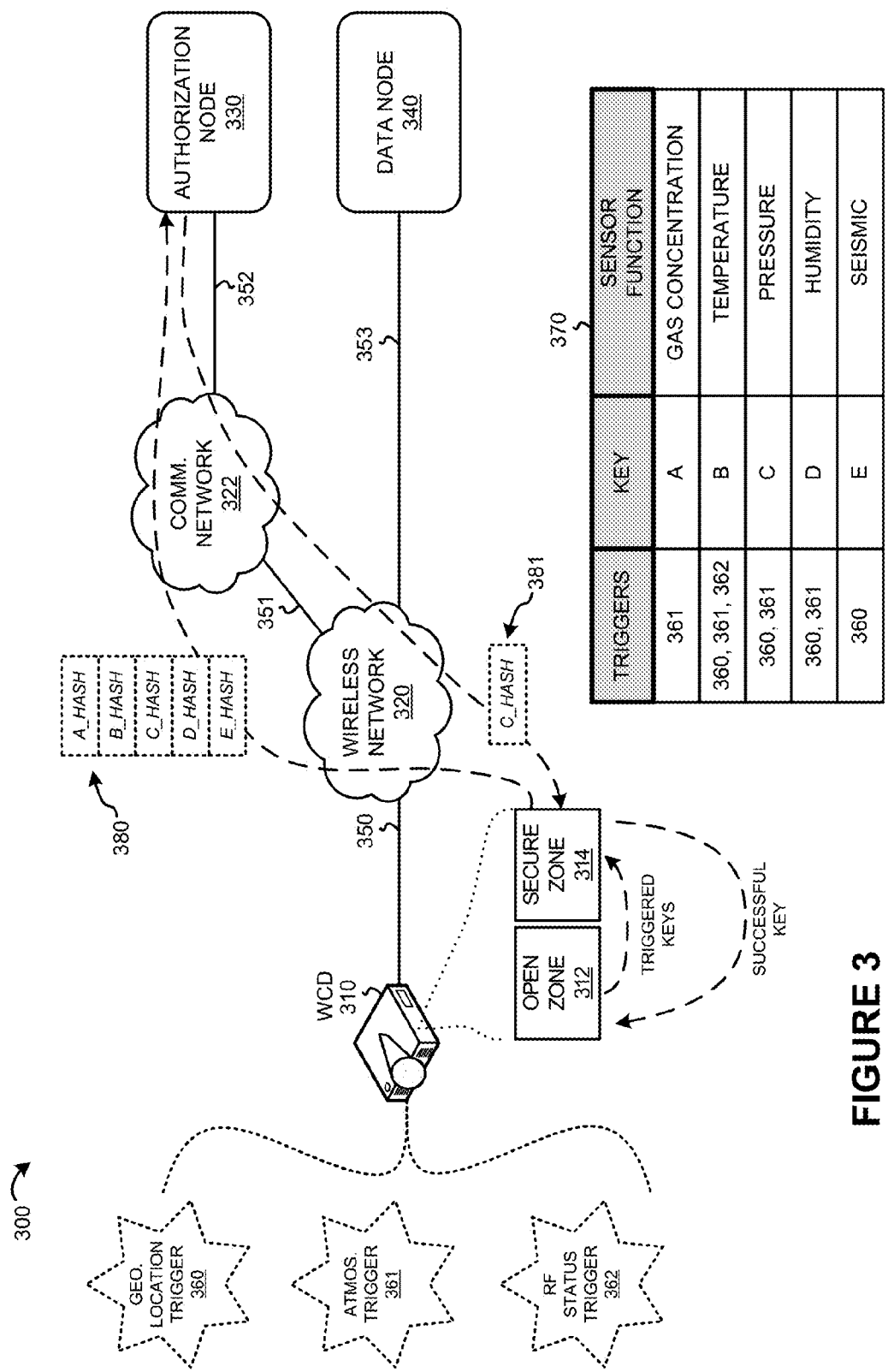
FIG. 3 is a system diagram illustrating a communication system.

As another example of a sensor system and associated communication and data nodes, FIG. 3 is presented. FIG. 3 is a system diagram illustrating communication system 300. Communication system 300 includes wireless communication device (WCD) 310, wireless network 320, communication network 322, authorization node 330, and data node 340. FIG. 3 also includes table 370 which indicates associations between trigger conditions, security keys, and sensor functions. WCD 310 and wireless network 320 communicate over wireless link 350, which is a cellular voice and data link in this example. Wireless network 320 and communication network 322 communicate over link 351, which is an optical networking link in this example. Authorization node 330 and communication network 322 communicate over link 352, which is an Ethernet communication link in this example. Data node 340 and wireless network 320 communicate over link 352, which is an Internet protocol (IP) link in this example.

WCD 310 includes a plurality of sensor functions, each function associated with a different sensor portion, sensor circuitry, or sensor device. In this example, at least 5 sensor functions are included in WCD 310, namely a gas concentration sensor function, temperature sensor function, pressure sensor function, humidity sensor function, and seismic sensor function, location sensor function, and radio frequency (RF) sensor function. It should be understood that any number and type of sensor functions can be included in WCD 310, including environmental, location, electromagnetic, nuclear, or other sensor types.

WCD 310 also is comprised of open zone 312 and secure zone 314. Each zone of WCD 310 can be implemented in a separate microprocessor, microprocessor core, virtual core, or other hardware or software partition that separates memory spaces, operating systems, drivers, and other operational hardware and software elements so as to provide a restricted level of access for applications and users to secure zone 314, and a non-restricted level of access for open zone 312. In some examples, open zone 312 comprises a standard core of a processor system, such as for operating an Android, Windows, iOS, or other user-accessible operating system. Likewise, secure zone 314 comprises in some examples, a secure core or "trust zone" core of a processor system which prevents access to the processing and memory elements of secure zone 314 unless authorized through a security exchange or security handshake with authorization node 330.

This partitioned configuration of secure zone 314 differs from user-level password protected access, in that any application that desires to execute on secure zone 314 must first be authorized by a security handshaking process with authorization node 330. Whereas open zone 312 might run applications after a user merely "logs in" or passes a user-level security access, and the applications executed on open zone 312 are not authorized through a security handshaking process with authorization node 330. In some examples, such as found in FIG. 1, a communication portion (such as communication portion 112) is located in open zone 312, while a sensor portion (such as sensor portion 114) is located in secure zone 314. It should be understood that these partitions can be varied.

Figure 4:
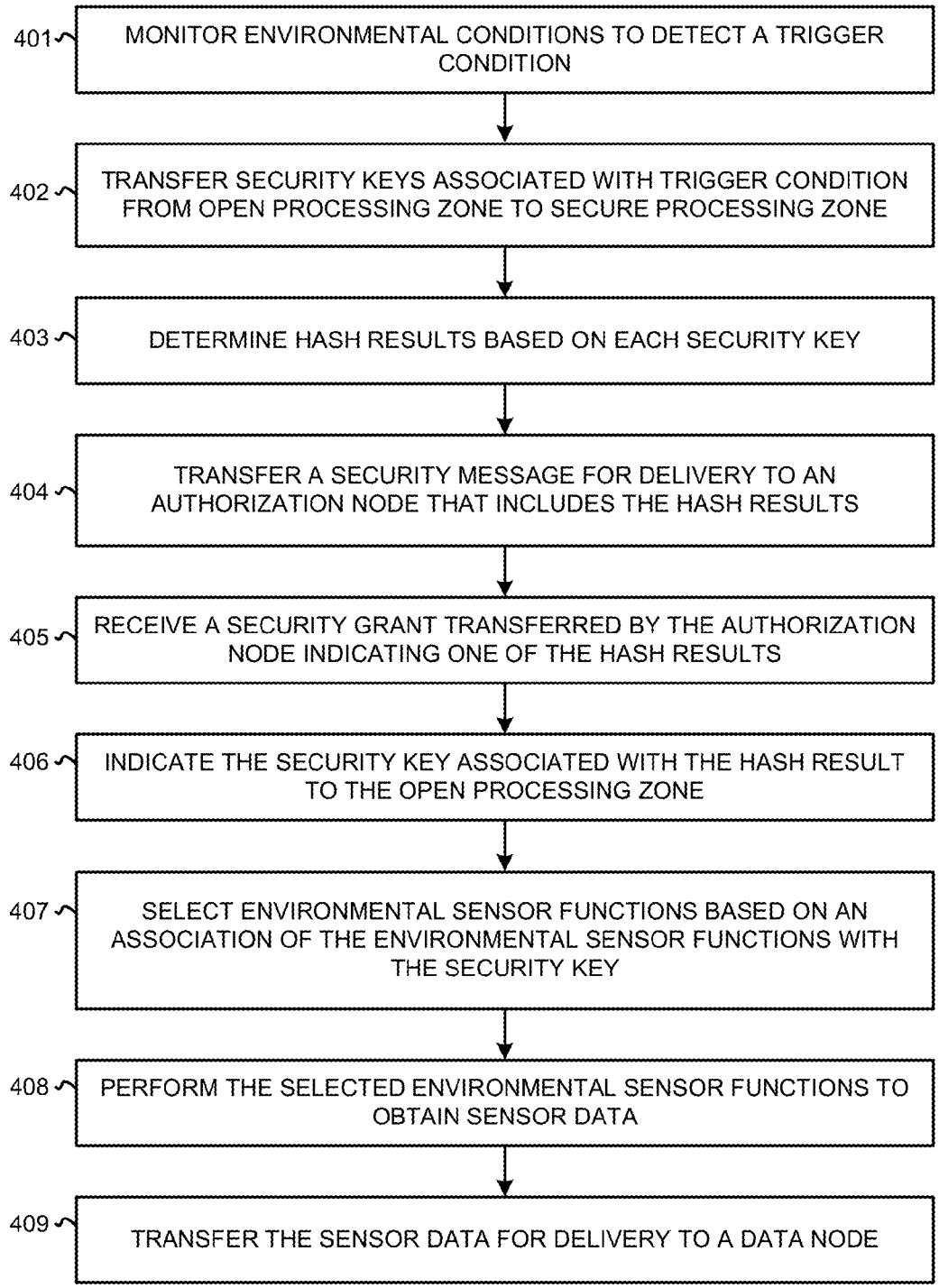
FIG. 4 is a flow diagram illustrating a method of operation of an environmental sensor system.

As an example operation of the elements of system 300, FIG. 4 is provided. FIG. 4 is a flow diagram illustrating a method of operation of communication system 300. The operations of FIG. 4 are referenced below parenthetically. In FIG. 4, WCD 310 monitors (401) environmental conditions to detect a trigger condition. In this example, several trigger conditions are shown. Namely, these trigger conditions are geographic location trigger 360, atmospheric trigger condition 361, and RF status trigger 362. It should be understood than other trigger conditions can be employed.

Geographic location trigger 360 comprises a threshold condition based on a geographic location of WCD 310, which can be determined by a Global Positioning System (GPS) sensor of WCD 310, trilateration with wireless access nodes, or other positioning sensors or systems. Geographic trigger condition 360 can be satisfied due to movement of WCD 310 which brings WCD 310 into a particular geographic area, region location, or other geographic area or position.

Atmospheric trigger condition 361 comprises a threshold condition based on atmospheric conditions detected by WCD 310, such as by an atmospheric pressure sensor, temperature sensor, humidity sensor, wind sensor, or other atmospheric sensor portions of WCD 310. Atmospheric trigger condition 361 can be satisfied due to atmospheric conditions monitored by WCD 310 satisfying one or more thresholds associated with each sensor.

RF status trigger 362 comprises a threshold condition based on RF signal conditions detected by WCD 310, such as by RF signal strength, signal-to-noise ratios, or other metrics of signal strength associated with RF signals of WCD 310. These RF signals can be associated with one or more wireless access nodes of wireless network 320, such as base station of a voice and data cellular network. RF status trigger 362 can also be associated with a signal property of link 350, which can be a wired RF link or a wireless RF link. RF status trigger 362 can be satisfied due to RF signal conditions monitored by WCD 310 satisfying one or more RF signal thresholds.

Responsive to a trigger condition being satisfied, WCD 310 transfers (402) security keys associated with the trigger condition from open processing zone to secure processing zone. In this example, open zone 312 has access to a plurality of security keys stored in a memory space accessible by open zone 312, such as a memory device. Also, a data structure is maintained which relates one or more trigger conditions to one or more security keys.

As shown in table 370 of FIG. 3, each security key can be associated with one or more trigger conditions. In table 370, geographic location trigger condition 360 is associated with security keys B, C, D, and E. Atmospheric trigger condition 361 is associated with security keys A, B, C, and D. RF status trigger condition 362 is associated with security key B. When a specific trigger condition is satisfied, then open zone 312 transfers the security keys associated with the trigger condition to secure zone 314. Although in this example, the actual security key or keys are transferred by open zone 312, in other examples, indications on the trigger conditions satisfied are transferred by open zone 312 and secure zone 314 correlates these trigger conditions to security keys in a data structure, such as listed in table 370.

Secure zone 314 of WCD 310 determines (403) hash results based on each security key transferred by open zone 312. The hash results can be determined based on a cryptographic hash function. For example, a security key can be processed by a cryptographic hash function such as secure hash algorithm (SHA) or message digest algorithm (MD) to determine a cryptographic hash result which is used as the hash result discussed here. Hash results are determined for each security key that is prompted by the one or more trigger conditions.

WCD 310 transfers (404) a security message for delivery to authorization node 330 that includes the hash results. In FIG. 3, security message 380 includes hash results which can include any hash result associated with security keys A-E, depending upon the particular trigger conditions satisfied. Security message 380 is transferred over link 350 for delivery to authorization node 330.

Secure zone 314 of WCD 310 receives (405) a security grant message transferred by authorization node 330 indicating one of the hash results. In this example, authorization node 330 transfers security grant message 381 over link 352 for delivery to WCD 310. Security grant message 381 indicates C_HASH as the selected hash result, as shown in FIG. 3. Authorization node 330 can select one or more of the hash results provided in security message 380 based on various factors.

One factor can be that the hash results correspond to a correct hash result, such as when a hash result might be tampered with or altered by an unauthorized system or user. Another factor can be a desired sensor function or sensor reading. For example, authorization node 330 can store a data structure which relates a particular sensor measurement to a particular hash result. When the various hash results are transferred by WCD 310 to authorization node 330, a preferred sensor reading can be instructed by authorization node 330 based on selecting a particular hash result. Table 370 of FIG. 3 illustrates relationships between security keys and sensor functions. Similar relationships can also be established in authorization node 330 between hash results for a particular security key and the various sensor functions. Thus, when authorization node 330 desires a seismic sensor reading, hash result E can be indicated to WCD 310 in a security grant message responsive to WCD 310 transferring a security message that includes hash result E, even if more hash results are included in the security message. Other sensor functions can be performed based on these relationships between trigger conditions, hash results, security keys, and sensor functions.

Secure zone 314 of WCD 310 indicates (406) the security key associated with the hash result to the open processing zone. Since the actual security key is not indicated in security grant message 381 in this example, secure zone 314 translates the hash result indicated in security grant message 381 into the associated security key, and indicates this security key to open zone 312 as a successful security key. It should be understood that more than one hash result can be indicated in security grant message 381, and thus more than one security key can be indicated to open zone 312 as successful security keys.

WCD 310 selects (407) environmental sensor functions based on an association of the environmental sensor functions with the security key. In this example, security key C is indicated as the successful key, and as per the relationship indicated in table 370, security key C relates to a pressure sensor function. Thus, WCD 310 selects the pressure sensor function based on successful authorization of security key C. It should be understood that more than one sensor function can be associated with each security key in table 370.

WCD 310 performs (408) the selected environmental sensor functions to obtain sensor data. In this example, WCD 310 performs a pressure sensor measurement, such as an atmospheric pressure reading via an atmospheric pressure sensor, and transfers (409) the sensor data for delivery to data node 340. Data node 340 can collect data associated with sensor readings of WCD 310, among other sensor devices. In some examples, the sensor data might already be detected or captured during the trigger condition in operation 401, and then only the sensor data need be transferred instead of a separate sensor reading. However, in this example, an associated sensor is prompted to make a sensor reading in response to the successful key indication. It should be noted that in some examples, data node 340 is included in authorization node 330.

Figure 5:
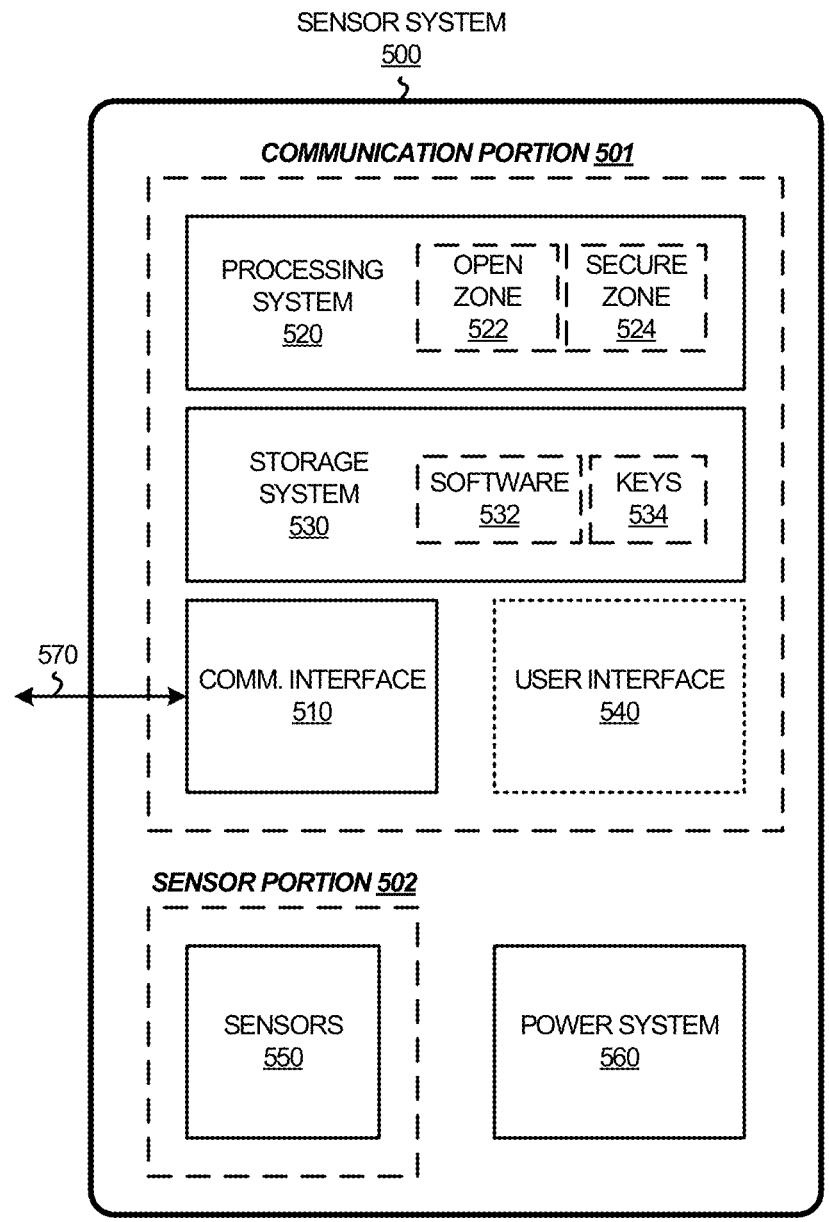
FIG. 5 is a block diagram illustrating an environmental sensor system.

FIG. 5 is a block diagram illustrating sensor system 500, as an example of sensor system 110 found in FIG. 1 or WCD 310 found in FIG. 3, although variations are possible. Sensor system 500 includes communication portion 501 and sensor portion 502. Communication portion 501 includes communication interface 510, processing system 520, storage system 530, optionally, user interface 540. Sensor portion 502 includes sensors 550. Sensor system 500 also includes power system 560, which can be included in any of communication portion 501 or sensor portion 502. It should be understood that the partitioning of the elements of sensor system 500 among communication portion 501 and sensor portion 502 can vary. Communication interface 510, processing system 520, storage system 530, user interface system 540, sensors 550, and power system 560 are communicatively coupled, and can communicate over associated discrete links, common busses, data links, power links, RF links, or other links. Sensor system 500 can be distributed or consolidated among equipment or circuitry that together forms the elements of sensor system 500. Sensor system 500 can optionally include additional devices, features, or functionality not discussed here for purposes of brevity.

Communication interface 510 comprises communication interface circuitry for communicating over communication link 570 with a communication network. In some examples, communication interface 510 includes wireless transceiver circuitry for communicating with base stations of a cellular voice and data network. Communication interface 510 could include transceiver equipment and antenna elements for wirelessly exchanging user communications and overhead communications over the associated link 570, among further links. Communication interface 510 also receives command and control information and instructions from processing system 520 or user interface system 540 for controlling the operations of communications over link 570. Link 570 could use various protocols or communication formats as described herein for links 140 or 141, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

In this example, processing system 520 includes open zone 522 and secure zone 524. Each zone of processing system 520 can be implemented in a separate microprocessor, microprocessor core, virtual core, or other hardware or software partition that separates memory spaces, operating systems, drivers, and other operational hardware and software elements so as to provide a restricted level of access for applications and users to secure zone 524, and a non-restricted level of access for open zone 522. In some examples, open zone 522 comprises a standard core of a processor system, such as for operating an Android, Windows, iOS, or other user-accessible operating system. Likewise, secure zone 524 comprises in some examples, a secure core or "trust zone" core of a processor system which prevents access to the processing and memory elements of secure zone 524 unless authorized through a security exchange or security handshake with an external authorization node.

This partitioned configuration of secure zone 524 differs from user-level password protected access, in that any application that desires to execute on secure zone 524 must first be authorized by a security handshaking process with an external authorization node. Whereas open zone 522 might run applications after a user merely "logs in" or passes a user-level security access, and the applications executed on open zone 522 are not authorized through a security handshaking process with an authorization node.

Storage system 530 can comprise any computer readable storage media or storage device readable by processing system 520 and capable of storing software 532 and security keys 534. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 and security keys 534 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by sensor system 500 in general or processing system 520 in particular, direct sensor system 500 or processing system 520 to perform environmental sensor functions, monitor environmental conditions to detect a trigger condition, transfer an access request for delivery to a remote data system responsive to the detection of the trigger condition, receive a security challenge transferred by the remote data system, and in response, transfer a security answer for delivery to the remote data system that includes at least one hash result generated using at least one of the security keys, receive a security grant transferred by the remote data system indicating one of the hash results, select one of the environmental sensor functions based on an association of the environmental sensor function with one of the security keys used to generate the hash result indicated in the security grant, perform the selected environmental sensor function to obtain sensor data, and transfer the sensor data for delivery to the remote data system, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to perform environmental sensor functions, monitor environmental conditions to detect a trigger condition, transfer an access request for delivery to a remote data system responsive to the detection of the trigger condition, receive a security challenge transferred by the remote data system, and in response, transfer a security answer for delivery to the remote data system that includes at least one hash result generated using at least one of the security keys, receive a security grant transferred by the remote data system indicating one of the hash results, select one of the environmental sensor functions based on an association of the environmental sensor function with one of the security keys used to generate the hash result indicated in the security grant, perform the selected environmental sensor function to obtain sensor data, and transfer the sensor data for delivery to the remote data system.

In general, software 532 can, when loaded into processing system 520 and executed, transform processing system 520 overall from a general-purpose computing system into a special-purpose computing system customized to perform environmental sensor functions, monitor environmental conditions to detect a trigger condition, transfer an access request for delivery to a remote data system responsive to the detection of the trigger condition, receive a security challenge transferred by the remote data system, and in response, transfer a security answer for delivery to the remote data system that includes at least one hash result generated using at least one of the security keys, receive a security grant transferred by the remote data system indicating one of the hash results, select one of the environmental sensor functions based on an association of the environmental sensor function with one of the security keys used to generate the hash result indicated in the security grant, perform the selected environmental sensor function to obtain sensor data, and transfer the sensor data for delivery to the remote data system, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Security keys 534 comprise one or more security keys, such as those discussed herein. These security keys are stored in storage system 530. In some examples, a separate physical storage device or memory space is employed to store security keys 534 and make available security keys 534 to secure zone 524 and not to open zone 522. In other examples, security keys 534 are stored in a shared memory space or memory device.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of sensor system 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Sensors 550 include a plurality of sensor functions. The sensor functions can include gas concentration sensor functions, temperature sensor functions, pressure sensor functions, humidity sensor functions, and seismic sensor functions, location sensor functions, and radio frequency (RF) sensor functions. It should be understood that any number and type of sensor functions can be included in sensors 550, including environmental, location, electromagnetic, nuclear, or other sensor types.

Power system 560 includes circuitry and a power source to provide power to the elements of sensor system 500. The power source could include a battery, solar cell, flywheel, capacitor, thermoelectric generator, chemical power source, dynamo, or other power source. In some examples, power system 560 receives power from an external source, such as a wall outlet or power adapter. Power system 560 also includes circuitry to condition, monitor, and distribute electrical power to the elements of sensor system 500.

Referring back to FIG. 1, sensor system 110 comprises a processing system, transceiver circuitry, communication elements, and sensor portions. The transceiver circuitry typically includes amplifiers, filters, modulators, and signal processing circuitry. The sensor portions include one or more sensors used to detect various environmental, electromagnetic, nuclear, geographic, or other conditions. The processing system can include one or more processing portions. Sensor system 110 can also include user interface systems, memory devices, non-transitory computer-readable storage mediums, software, processing circuitry, or some other communication components. Sensor system 110 can be a sensor device, user device, subscriber equipment, customer equipment, access terminal, wireless smartphone, computer, mobile Internet appliance, wireless network interface card, media player, game console, or some other communication apparatus, including combinations thereof.

Communication network 120 comprises communication and control systems for providing access to communication services for other devices and networks. Communication network 120 can each provide communication services including communication routing, link bridging, network communications, data exchange, or other communication services. In some examples, communication network 120 is a cellular voice and data network that can provide voice calls, text messages, data access, or other communication services provided over cellular or wireless communication networks. In some examples, communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Remote data system 130 comprises computer processing systems and equipment to authorize processing functions or sensor functions of sensor systems or user devices, such as sensor system 110. Remote data system 130 can include communication or network interfaces, as well as computer systems, microprocessors, circuitry, cloud-based systems, or some other processing devices or software systems, and can be distributed among multiple processing devices. Examples of remote data system 130 can also include software such as an operating system, logs, databases, utilities, drivers, networking software, and other software stored on a computer-readable medium.

Communication links 140-141 each use metal, glass, optical, air, space, or some other material as the transport media. Communication links 140-141 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 140-141 can each be a direct link or can include intermediate networks, systems, or devices, and can include a logical network link transported over multiple physical links. Communication links 140-141 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In some examples, communication links 140-141 are wireless links, and use the air or space as the transport media. Wireless links 140-141 each comprises one or more wireless communication links provided over an associated wireless frequency spectrum or wireless frequency band, and can use various protocols. In this example, wireless link 130 can comprise Long Term Evolution (LTE), LTE Advanced, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-141 is shown in FIG. 1, it should be understood that links 140-141 are merely illustrative to show communication modes or access pathways for sensor system 110 and remote data system 130.

In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating an environmental sensor system comprising a sensor portion to perform a plurality of environmental sensor functions and a communication portion that stores a plurality of security keys, the method comprising:
   in the sensor portion, monitoring at least one environmental condition to detect a trigger condition related to the environmental condition;
   in the communication portion, transferring an access request for delivery to a remote data system responsive to the detection of the trigger condition;
   in the communication portion, receiving a security challenge transferred by the remote data system, and in response, transferring a security answer for delivery to the remote data system that includes at least one hash result generated using at least one of the security keys;
   in the communication portion, receiving a security grant transferred by the remote data system indicating one of the hash results;
   in the communication portion, selecting at least one of the environmental sensor functions based on an association of the environmental sensor functions with one of the security keys used to generate the hash result indicated in the security grant;
   in the sensor portion, performing the selected environmental sensor function to obtain sensor data; and
   in the communication portion, transferring the sensor data for delivery to the remote data system.

2. The method of claim 1, wherein the environmental condition comprises at least one of a geographic location, an atmospheric condition, and a radio frequency (RF) status.

3. The method of claim 1, wherein the sensor portion comprises ones of a gas concentration sensor, a temperature sensor, a pressure sensor, a humidity sensor, and a seismic sensor.

4. The method of claim 1, wherein the access request comprises a request to perform an environmental sensor function to obtain sensor data.

5. The method of claim 1, wherein the security challenge comprises at least one request for the at least one hash result generated using the at least one of the security keys.

6. The method of claim 1, wherein the at least one of the security keys is selected based on at least the trigger condition.

7. The method of claim 1, wherein more than one hash result is transferred in the security answer, each hash result generated using a different one of the security keys.

8. The method of claim 1, wherein the remote data system selects the indicated one of the hash results based on a successful authentication of the indicated one of the hash results.

9. The method of claim 1, wherein selecting the at least one of the environmental sensor functions based on an association of the environmental sensor functions with the one of the security keys used to generate the hash result indicated in the security grant comprises maintaining a data structure relating ones of the environmental sensor functions to ones of the security keys, and selecting the at least one of the environmental sensor functions based on at least the data structure.

10. The method of claim 1, further comprising:
    in a secure processing zone of the communication portion, receiving the at least one of the security keys from an open processing zone of the communication portion in response to the trigger condition;
    in the secure processing zone, processing the at least one of the security keys to determine the at least one hash result generated using at least one of the security keys;
    in the secure processing zone, responsive to receiving the security grant transferred by the remote data system indicating the one of the hash results, indicating an authorized one of the security keys to the open processing zone; and
    in the open processing zone, selecting at least one of the environmental sensor functions based on an association of the environmental sensor functions with the authorized one of the security keys.

11. An environmental sensor system, comprising:
    a sensor portion configured to perform a plurality of environmental sensor functions and monitor environmental conditions to detect a trigger condition;
    a communication portion that stores a plurality of security keys and is configured to:
        transfer an access request for delivery to a remote data system responsive to the detection of the trigger condition;
        receive a security challenge transferred by the remote data system, and in response, transfer a security answer for delivery to the remote data system that includes at least one hash result generated using at least one of the security keys;
        receive a security grant transferred by the remote data system indicating one of the hash results;
        select one of the environmental sensor functions based on an association of the environmental sensor function with one of the security keys used to generate the hash result indicated in the security grant;
    the sensor portion configured to perform the selected environmental sensor function to obtain sensor data; and
    the communication portion configured to transfer the sensor data for delivery to the remote data system.

12. The environmental sensor system of claim 11, wherein the environmental condition comprises at least one of a geographic location, an atmospheric condition, and a radio frequency (RF) status.

13. The environmental sensor system of claim 11, wherein the sensor portion comprises ones of a gas concentration sensor, a temperature sensor, a pressure sensor, a humidity sensor, and a seismic sensor.

14. The environmental sensor system of claim 11, wherein the access request comprises a request to perform an environmental sensor function to obtain sensor data.

15. The environmental sensor system of claim 11, wherein the security challenge comprises at least one request for the at least one hash result generated using the at least one of the security keys.

16. The environmental sensor system of claim 11, wherein the at least one of the security keys is selected based on at least the trigger condition.

17. The environmental sensor system of claim 11, wherein more than one hash result is transferred in the security answer, each hash result generated using a different one of the security keys.

18. The environmental sensor system of claim 11, wherein the remote data system selects the indicated one of the hash results based on a successful authentication of the indicated one of the hash results.

19. The environmental sensor system of claim 11, comprising:
   maintaining a data structure relating ones of the environmental sensor functions to ones of the security keys, and selecting the at least one of the environmental sensor functions based on at least the data structure.

20. The environmental sensor system of claim 11, comprising:
   a secure processing zone of the communication portion configured to receive the at least one of the security keys from an open processing zone of the communication portion in response to the trigger condition;
   the secure processing zone of the communication portion configured to process the at least one of the security keys to determine the at least one hash result generated using at least one of the security keys;
   the secure processing zone of the communication portion configured to indicate an authorized one of the security keys to the open processing zone responsive to receiving the security grant transferred by the remote data system indicating the one of the hash results; and
   the open processing zone of the communication portion configured to select at least one of the environmental sensor functions based on an association of the environmental sensor functions with the authorized one of the security keys.

\* \* \* \* \*